United States Patent [19]

Ayers

[11] Patent Number: 4,924,206

[45] Date of Patent: May 8, 1990

[54] CAR SECURITY SYSTEM AND METHOD

[76] Inventor: Robert F. Ayers, 206 Missouri Ave., Lynn Haven, Fla. 32444

[21] Appl. No.: 279,868

[22] Filed: Dec. 5, 1988

[51] Int. Cl.$^5$ ............................................. B60R 25/00
[52] U.S. Cl. ..................................... 340/426; 340/539
[58] Field of Search ............................... 340/426, 539

[56] References Cited

U.S. PATENT DOCUMENTS

| 4,125,826 | 11/1978 | Rasmussen et al. | 340/426 |
| 4,593,273 | 6/1986 | Narcisse | 340/539 |
| 4,706,689 | 11/1987 | Man | 340/539 |
| 4,814,751 | 3/1989 | Hawkins et al. | 340/539 |

Primary Examiner—Joseph A. Orsino
Assistant Examiner—Frank M. Scutch, III
Attorney, Agent, or Firm—Arthur G. Yeager

[57] ABSTRACT

A security and alarm system for vehicles includes a portable receiving unit with a remote alarm therein and a transmitter unit physically placed with a vehicle. The transmitter unit broadcasts a continuous radio frequency signal received by the receiver unit. The transmitter unit includes a cadmium sulfide photocell sensor responsive to access into the vehicle which will turn the transmitter off and activate a local alarm. The receiver unit constantly monitors the transmitter signal and will activate an alarm if the transmitted signal is not present for any reason, such as the vehicle being towed beyond the broadcast range.

18 Claims, 3 Drawing Sheets

CAR SECURITY SYSTEM AND METHOD

BACKGROUND OF THE INVENTION

1. Field of the Invention

The present invention pertains generally to alarm and security systems and particularly to remote alarm systems, such as those associated with automobiles.

2. Prior Art

A wide variety of vehicle alarm devices are known in the prior art and include door opening alarms, motion detectors and the like. Several of these employ transmitter/receiver systems. In U.S. Pat. No. 3,893,069, for example, a tone generator produces a signal transmitted from a transmitter when a compartment of the vehicle is opened. The operator of the vehicle has a receiver which will pick up the transmitted signal. The receiver can be a walkie-talkie and the received tone indicate tampering with the vehicle. In U.S. Pat. No. 3,703,703, a vehicle has a transmitter, coupled to the interior dome light, and it sends out a signal upon tampering with the ignition.

The operator of the latter vehicle can wear a bracelet containing a receiver. Another transmitter/receiver car security device is disclosed in U.S. Pat. No. 3,703,714. None of these systems, for example, will activate the alarm function, if someone is able to disconnect the car battery without activating a hood switch alarm. This is not very difficult to do, particularly if a thief plans ahead.

Continuous transmission devices such as U.S. Pat. No. 4,110,738 involve very complex coding schemes that are expensive and susceptible to generating false alarms. Also, a wide variety of separate back-up circuits exist as are discussed in U.S. Pat. No. 4,319,230.

Some devices such as that disclosed in U.S. Pat. No. 4,523,178 comprise a transmitter carried by an operator and a receiver mounted in several vehicles responsive to an encoded signal for activating a horn o other alarm for personal safety. A mechanism for disabling the ignition is physically associated with a receiver receptacle in a particular vehicle.

In U.S. Pat. No. 4,658,237, a vehicle intrusion alarm system broadcasts an alarm signal on the citizens band frequency. Further, a group of ganged-thumbwheel switches are used to provide a personal coding scheme to disable the transmitter when an authorized operator is in the vehicle. The alarm function is enabled by sensing a change in the vehicle system's voltage magnitude greater than a preselected tolerable maximum. Time-delay circuitry is used to provide for no alarm during authorized entry and exit time periods. Importantly, the transmitter broadcasts only during an alarm-sensing function. Accordingly, a transmitter failure does not itself indicate an alarm. That is to say, there is no "fail-safe" provision in this device.

The devices in the prior art are unsatisfactory for a number of reasons. First, the intrusion/security systems are often difficult to install and, if it is done professionally, expensive to install. These systems are susceptible to tampering by accessing the wire runs or sensors. Secondly, the devices are generally not portable. By installing the devices in a particular vehicle it is generally difficult or impossible to transfer the system from one vehicle to another. Thirdly, the other known alarms do not claim protection against simply towing the car away. Thus, if the vehicle is out of the range of the transmitter, no alarm is possible. The present invention will set off an alarm once the transmitter is out of range. Fourthly, the present invention employs a continuous transmission and thus if power is lost, the alarm will sound. This is far more satisfactory than the need for complex power back-up circuitry. Fifthly, the present invention specifically protects against false alarms due to momentary power interruptions. Sixthly, continuous transmission devices employ complex coded signals which increase the likelihood of false alarms. Finally, the present invention employs a fail-safe design: if either the power supply fails or there is a circuit component failure, the alarm will be activated.

None of the devices in the prior art are completely satisfactory and therefore, only a device in accordance with the present invention meets all of the requirements for a safe, inexpensive and reliable intrusion security alarm system.

SUMMARY OF THE INVENTION

In accord with the present invention there is provided a security alarm system for indicating access to a protected area comprising a transmitter means for continuously transmitting a radio frequency signal and power supply means for supplying electric power to the transmitter means. A receiver means continuously receives the radio frequency signal as an input signal and provides a receiver output signal in response to received input signal. An indicating means is operatively coupled to the receiver means and is responsive to a disabling condition of an insufficient input signal to provide the receiver output signal.

Various aspects are provided by a sensor means located within the protected area which is responsive to access to the protected area, and such sensor means provides an output signal indicative of such access to the protected area. A transmitter control means is responsive to the output signal of the sensor and produces a disabling condition for the transmitter means in response to access to the protected area. The transmitter control means also includes switch means for selectively energizing or de-energizing the transmitter means. The switch means is responsive to the sensor means for de-energizing the transmitter means when access to the protected area has occurred. The sensor preferably is a photocell responsive to light associated with access to the protected area. The photocell and the transmitter means are located within the protected area. In addition, the alarm means is responsive to the output signal from the sensor means and provides an alarm signal in response to access to the protected area. The system also includes circuit connection means for selectively connecting or disconnecting the power supply means to the transmitter means. A time-delay circuit means is included for preventing operation of the alarm means for a predetermined time period after electric power is supplied to the transmitter means from the power supply means by the connection circuit means.

An important aspect of the system includes use thereof for a vehicle having an interior light responsive to opening of any door such that an interior light is illuminated. The sensor means includes a light-sensitive photocell output signal to the alarm means when such light is illuminated with the alarm means providing an alarm signal when any door is opened. In another aspect of the invention, the radio frequency signal has a first and second frequency component and the receiver means is adapted to provide a first receiver output signal in response to the first frequency component and a second receiver output signal in response to the second frequency component. The indicating means is adapted to be responsive to the first and second receiver output signals for providing an indicator output signal in the absence of one receiver output signal, and alarm means provides an alarm signal in the absence of either the first and/or second receiver output signal.

Finally, in accord with the present invention there is provided a method of detecting access to a vehicle that utilizes a radio frequency transmitter in the vehicle and operated by a sensor responsive to access to the vehicle, a remote radio signal receiver providing a first output signal in response to receiving the radio signal from the transmitter and a second output signal in response to insufficient reception of the radio signal comprising the steps of continuously transmitting a radio signal by the transmitter; continuously monitoring by the receiver of the transmitted signal; deactivating the transmitter by the sensor when access to the vehicle has occurred; and providing by the receiver an output signal indicating insufficient reception of the radio signal. The method also includes the use of a radio signal having a first and second frequency component and alarm circuitry responsive to the absence of one of the first and second output signals from the receiver and includes the step of activating the alarm circuitry in the absence of one of the first and second frequency signals.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

DETAILED DESCRIPTION OF THE PREFERRED EMBODIMENT

Figure 1:
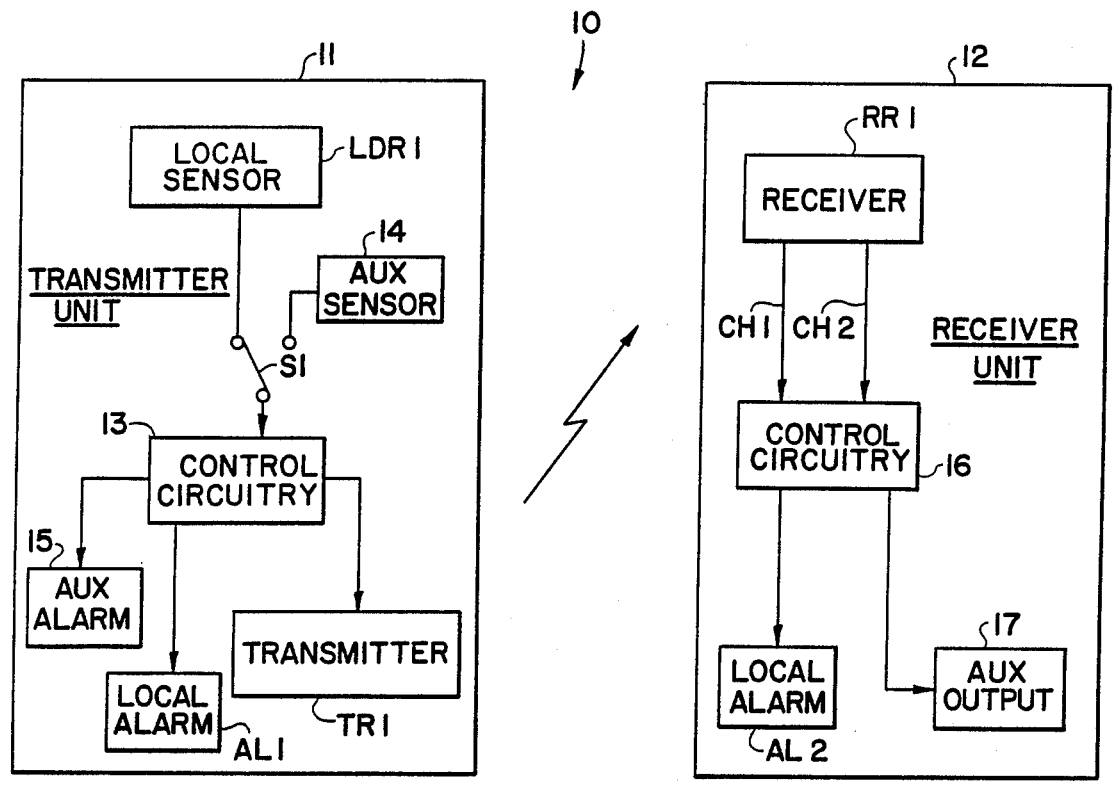
FIG. 1 is a simplified block diagram of the transmitter and receiver units in accord with the present invention.

Referring now to FIG. 1, a simplified block diagram of the security system in accord with the present invention is depicted by the numeral 10. A transmitter unit 11 is physically located in an area to be protected, such as a vehicle. The transmitter unit 11 transmits a radio frequency signal to receiver unit 12. The transmitter unit 11 contains control circuitry 13 which controls a conventional AM or FM radio transmitter TR1. The control circuitry 13 is itself responsive to either a local sensor LDR1, such as a photocell, or an auxiliary sensor 14 as selected by switch S1. The control circuitry 13 provides output signals to a local alarm, AL1, and/or an auxiliary alarm 15.

Receiver RR1 continuously receives a signal from transmitter TR1 and supplies output signals on channels CH1 and CH2 as will be discussed in more detail hereinbelow. Control circuitry 16 monitors CH1 and CH2 and provides alarm function output signals to local alarm AL2 and/or auxiliary output 17. The alarm functions of receiver unit 12 will be activated when either CH1 and/or CH2 is not present. The loss of signal inputs to receiver unit 12 can be the result of the receiver RR1 being out of range, which results in a received signal below the sensitivity of RR1, or the loss of an output signal from transmitter TR1.

When used in conjunction with a vehicle, local sensor LDR1 is responsive to access into the vehicle. In the preferred embodiment of the present invention, LDR1 is a cadmium sulfide photocell that is mounted in close proximity to an interior light, preferably a light located near the floor or on a side door. When the light is illuminated by opening a door, LDR1 provides an output signal indicating access to control circuitry 13. Alternatively, auxiliary sensor 14 can be selected via S1. The auxiliary sensor 14 can be a switch operable by a car door to supply a current signal or whatever means are appropriate.

Control circuitry 13 will provide an output signal to remove power to transmitter TR1 on reception of the intrusion signal from photocell LDR1 or auxiliary sensor 14. At the same time, control circuitry 13 will also activate local alarm AL1 and/or auxiliary alarm 15. The loss of a transmitted signal will be picked up by receiver control circuitry 16 as a loss of CH1 and/or CH2 signals. Control circuitry 16 will then activate receiver local alarm AL2 and/or auxiliary output 17. In addition, if receiver unit 12 is separated by sufficient distance from the transmitter unit 11, the receiver local alarm AL2 will also be activated because of a loss of CH1 and CH2. Preferably, the transmitter unit 11 is readily mountable in and removable from a vehicle by mounting via an adhesive-backed Velcro fastener assembly. Receiver unit 12 is carried by the vehicle operator. Thus, if a vehicle is towed away, the receiver alarm functions will be energized. The transmitter alarm functions would not be energized unless the act of removing the vehicle were to be detected via auxiliary sensor 14 which could be, for example, a motion sensor.

Figure 2:
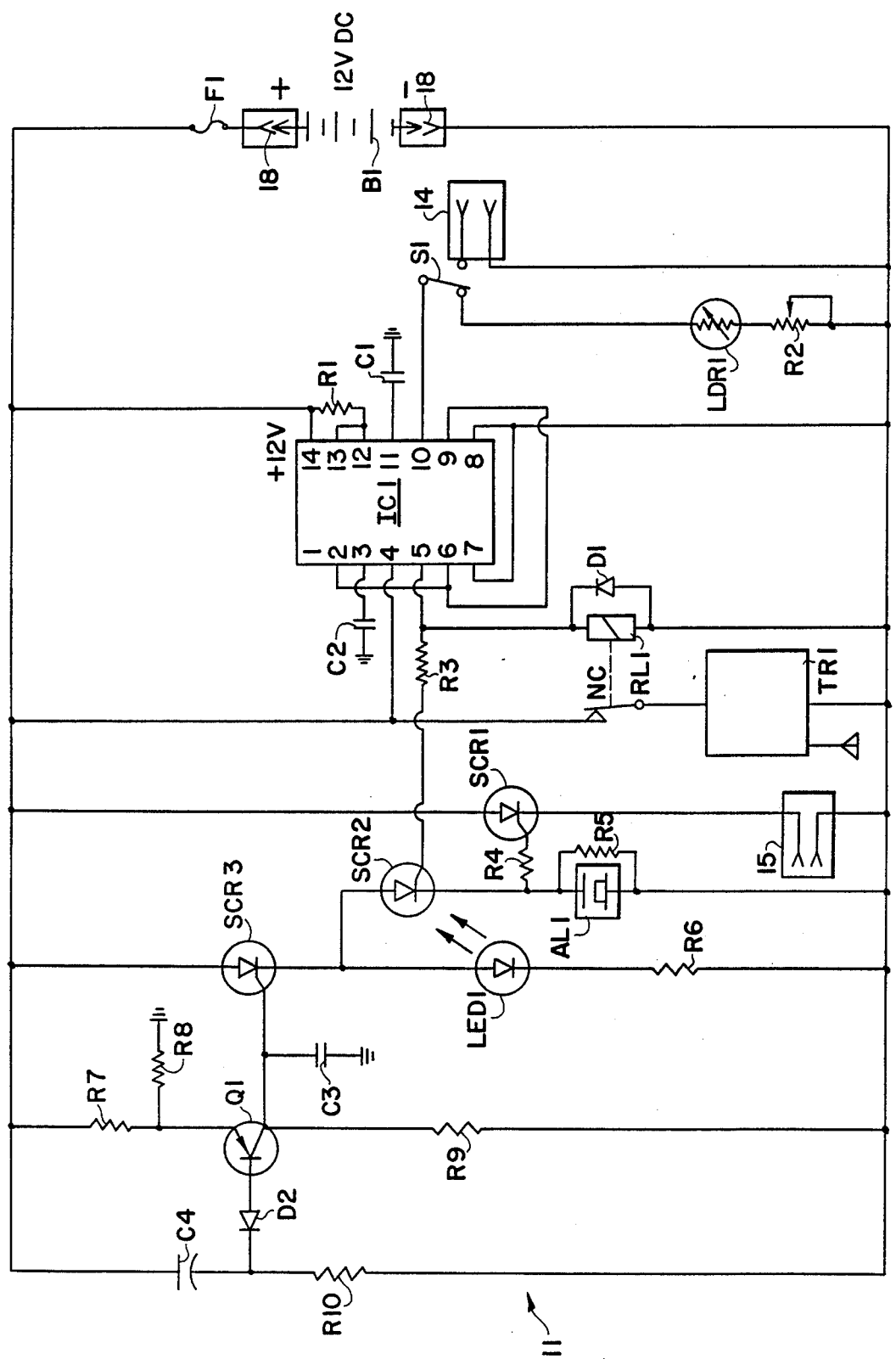
FIG. 2 is a schematic diagram of the circuitry of the transmitter unit of FIG. 1.

In FIG. 2, the circuitry of the transmitter unit 11 is illustrated. The transmitter unit 11 is powered by +12 vdc, preferably from the car battery B1 via fuse F1. The specific connection circuit 18 employed is the vehicle's cigarette lighter to enhance the ease of moving the transmitter to another vehicle. Power to IC1 is via pin 14. IC1 comprises the principal component of the control circuitry 13 and is preferably a 556 dual timing circuit employed as an electronic controller. Pins 3 and 11 are control voltage pins and are tied to ground via filter capacitors C2 and C1, respectively. C2 and C1 prevent electrical noise from interfering with circuit operation. Pins 8–13 are wired as a line driver; pins 1–6 are wired as a trigger circuit.

Power to the conventional RF transmitter TR1 is via the normally closed contacts of relay switch RL1. C4 and R10 comprise a time-delay circuit which will prevent Q1 from turning on for 45 seconds after energizing the transmitter unit 11. D2 acts as a polarity guard for Q1. The operating point for Q1 is established in the usual manner by voltage divider R7 and R8 and R9. After the initial 45 second time delay, Q1 will turn on applying a trigger voltage to the gate of SCR3 which itself turns on and applies power via R6 to LED1 which indicates that the circuit is energized properly. LED1 will latch the C4 and R10 time-delay circuit. If power were removed before the 45-second delay, the time delay will reset and then time out on subsequent energization of the circuit. C3 acts as a transient filter to prevent premature triggering of SCR3 during initial energization of the circuit.

LDR1 is a cadmium sulfide photocell. When sufficient light strikes LDR1, IC1 will reset via pin 10 which then sends output pin 9 low along with threshold pin 2 and trigger pin 6. When voltage on pins 2 and 6 drops to less than ⅓ of vcc (pin 14), pin 5 output signal goes high. The high voltage on pin 5 energizes relay switch RL1 which then opens its contacts and cuts power to the transmitter TR1. At the same time, the high level signal on pin 5 will trigger SCR2 via R3. With SCR2 on, piezoelectric buzzer AL1 will be energized. R5 is essential to the proper operation of AL1. The signal through R5 will apply a trigger via R4 to SCR1 causing it to turn on if auxiliary alarm 15 will also be activated at the same time as AL1.

IC1 is chosen to have a hysteresis effect with regard to the reset of pin 5 voltage. Pins 2 and 6 must go high to a level of ⅔ of vcc before pin 5 will reset to low. Thus, lowering the light input to LDR1 will not, up to a point, reset the flip-flop in IC1 via pin 10. Conversely, a low light input to LDR1 will not result in a false alarm. This "deadband" of ⅓-⅔ vcc will also reduce "chatter" of RL1 via pin 5. Optional resistor R2 is used to adjust LDR1 sensitivity for pin 10 reset depending upon the type of photocell used as LDR1.

In summary, when sufficient light strikes LDR1 or the auxiliary sensor 14 is activated by appropriate means, two alarm-related functions occur: first, power to transmitter TR1 is removed and it stops supplying a transmitted signal; and second, piezo alarm buzzer AL1 is energized (and auxiliary alarm 15, if used).

Figure 3:
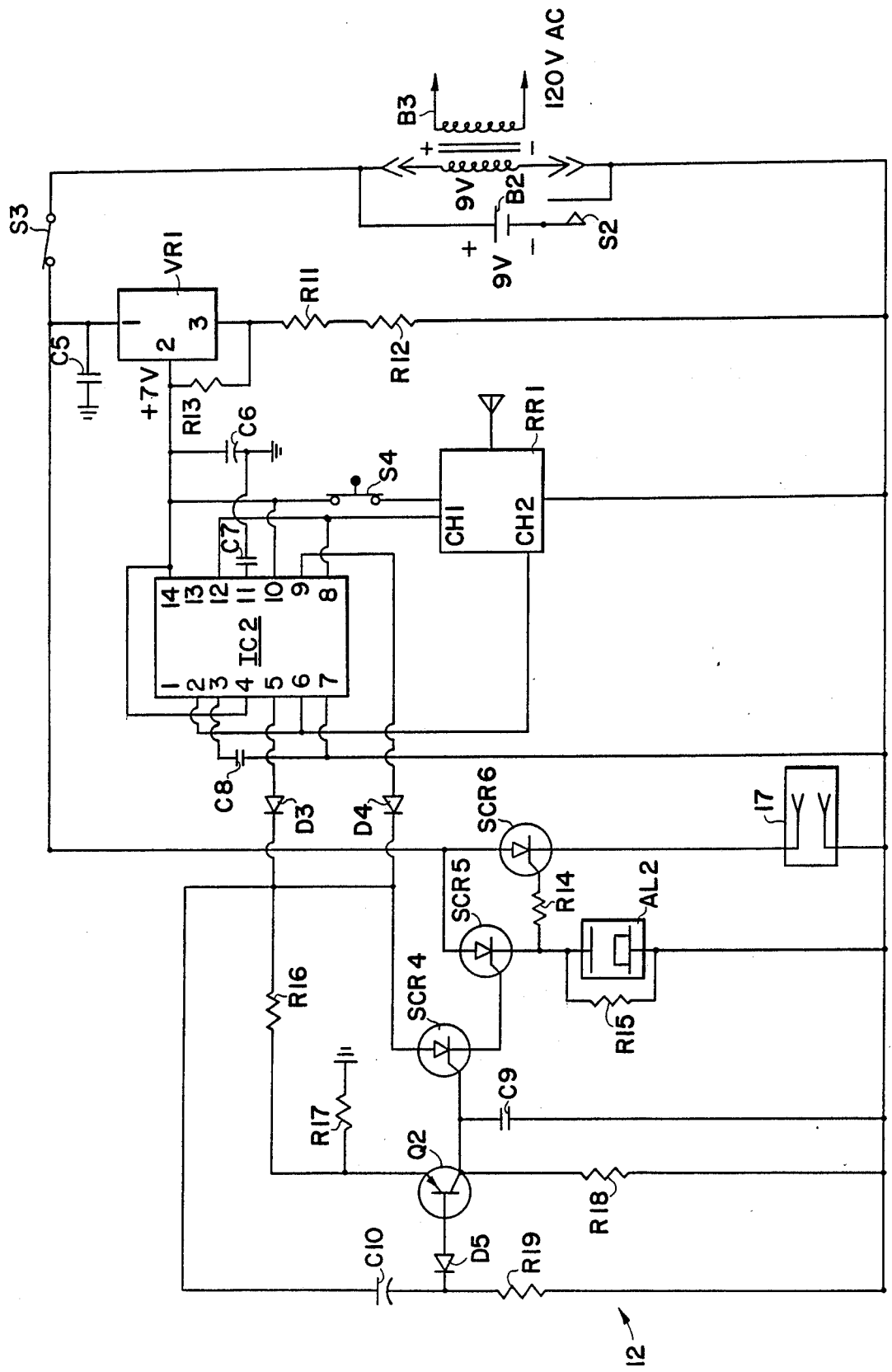
FIG. 3 is a schematic diagram of the circuitry of the receiver unit of FIG. 1.

Referring now to FIG. 3, the circuitry of the receiver unit 12 is illustrated. The receiver unit 12 is powered by +9 vdc either from a battery B2 or by a conventional AC-DC adapter B3. Switch S3 is the main power switch. Input power is regulated to +7 vdc by 3-terminal adjustable voltage regulator VR1. Resistors R11 and R12 set the voltage at +7 vdc. R13 is connected between Vout and ADJ, pins 2 and 3, respectively, to provide precision current regulation. Preferably, VR1 is a standard LM317T regulator, a device well known in the art. Capacitors C5 and C6 are filters for VR1 and provide improved transient response.

Power to the conventional two-channel RF receiver RR1 is supplied via normally closed momentary Alarm Test switch S4. The value of R13 is determined by the load on the circuit for a given receiver RR1. Power is supplied to Q2 from pins 5 and 9 of IC2 via C10 and R19 which provide a time delay of 0.7 seconds through polarity guard D5. Q2 is normally off. When Q2 turns on it supplies a gate signal to SCR4. Thus, with power initially supplied to the circuitry, SCR4 can be turned on either by (1) a high signal on IC2 pin 9 or (2) a high level signal on IC2 pin 5 either of which will turn Q2 on. The operating point for Q2 is set in the usual manner via resistors R16, R17 and R18. C9 acts as a transient filter to prevent premature firing of SCR4. Diodes D3 and D4 isolate pins 5 and 9 from each other when one signal is high and the other signal is low.

IC2, like IC1, is a 556 dual timing circuit with pins 8-13 and 1-6 both wired as trigger circuits. IC2 comprises most of the receiver unit control circuitry 16. Pin 7 is ground and pin 14 is vcc. C7 and C8 filter the control voltage on pins 11 and 3. Channel 1 (CH1) of RR1 is connected to pins 8 (trigger) and 12 (threshold) of IC2. Pins 8 and 12 function as a signal monitor for CH1.

Similarly, channel 2 (CH2) is wired to pins 2 (threshold) and 6 (trigger) of IC2. Pins 2 and 6 function as a signal monitor for CH2. With a CH1 high signal to pins 8 and 12, pin 9 (output) will be low. With a CH2 high signal to pins 2 and 6, pin 5 (output) will be low. When and if CH1 and/or CH2 go low or off, their respective IC2 output signals at pin 9 or pin 5 will be high. Accordingly, losing either CH1 and/or CH2 will turn on Q2 after a 0.7 second time delay. When SCR4 turns on, a gate signal will turn on SCR5 which in turn activates piezo-electric buzzer AL2 via R15. A loss of either CH1 or CH2 will trip AL2. SCR6 will also be triggered on via R14 if auxiliary output 17 is connected to the circuitry. Auxiliary output 17 may be an alarm or some other function as desired in the circumstances.

Momentary switch S4 can be used to test the alarm circuitry associated with the receiver unit 12. When S4 is depressed it opens and removes power to receiver RR1 thus simulating a loss of CH1 and CH2. If S4 remains open for at least 0.7 seconds, the loss of CH1 and CH2 signals will result in pin 5 and pin 9 switching to a high level and initiating the alarm AL2. The alarm AL2 will remain on until power switch S3 is opened.

When receiver unit 12 is energized via S3, IC2 pins 5 and 9 go high for about 0.1 second and then reset to low. This time interval is shorter than the 0.7 second delay that C10 and R19 provide and thus pins 5 and 9 will be reset low before Q2 is turned on. Thus, no alarm function will be initiated when the operator turns on the receiver unit 12 or a power outage occurs while in use.

With reference to the radio frequency transmitter TR1 and receiver RR1, the preferred embodiment of the present invention employs a transmitter TR1 that transmits on two channels by using a carrier frequency and one or more tone-pulse modulated frequencies. As is well understood in the art, receiver RR1 can readily detect the frequencies used and by appropriate bandpass filters supply an output signal representative of such incoming frequency. RR1 provides two output signals, CH1 and CH2 to IC2. Accordingly, a thief would require knowledge of the carrier frequency and the tone-pulse modulation frequency in order to defeat the signal monitoring features of RR1 and IC2. In addition, the use of two channels allows for a wide variety of combinations that would greatly enhance the difficulties for a thief.

The operation of the security system can be summarized as follows. If the receiver unit 12 fails to receive both CH1 and CH2 signals for any reason, the alarm function, AL2, will be activated. Thus, if power fails to the transmitter TR1 because the battery B1 has been stolen, the receiver alarm AL2 will be activated. This is a most desirable "fail-safe" feature Also, if the transmitter unit 11 is moved beyond the range of transmitter TR1, the receiver RR1 will lose CH1 and CH2 causing an alarm function. For example, if the vehicle in which transmitter unit 11 is installed is towed away, a receiver alarm will occur at the distance where the transmitted signal is too low to be picked up by RR1.

Figure 4:
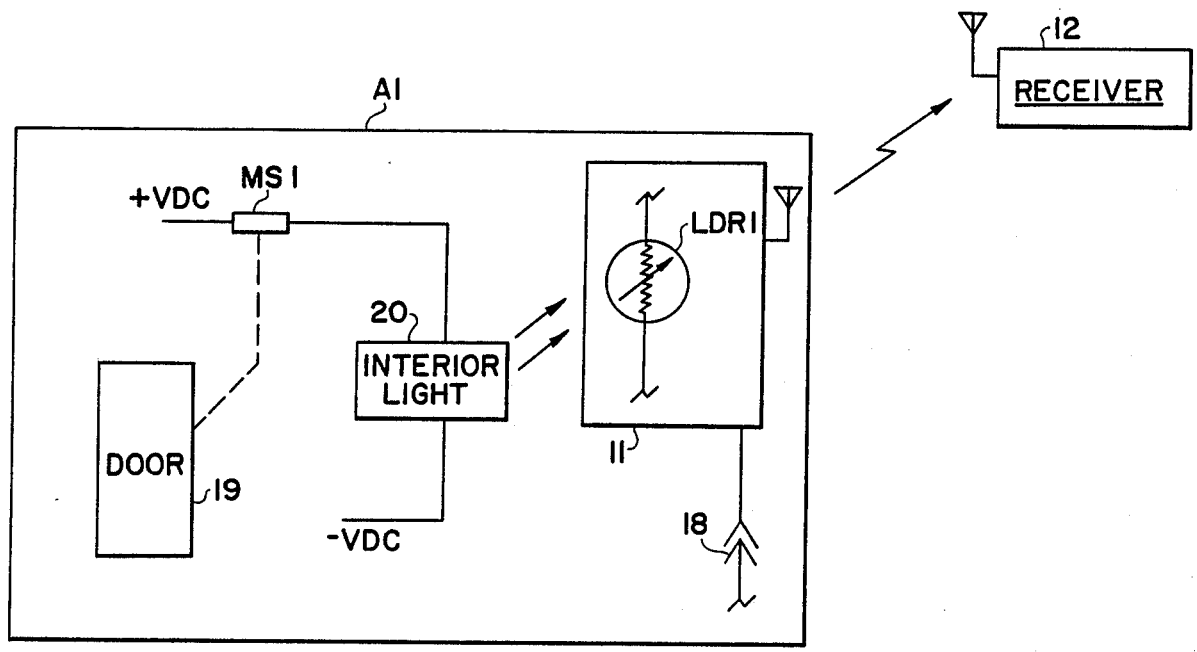
FIG. 4 is a simplified pictorial diagram illustrating a specific use of the transmitter and receiver units of FIG. 1 in an automobile.

In FIG. 4, a specific preferred embodiment of the present invention is illustrated in simplified form. The transmitter unit is plugged into a cigarette lighter 18 of automobile A1. Auto A1 has a door 19, which when opened, will illuminate interior light 20 via mechanical switch MS1. Photocell LDR1 is located in close proximity to light 20 and will pick up light and provide a current signal to IC1 as explained in detail hereinabove. Receiver unit 12, located a distance away but within the range of transmitter TR1, will initiate its alarm AL2 when channels CH1 and/or CH2 are lost. Preferably, interior light 20 is mounted near the floor or door to prevent ambient light from striking LDR1 which is located close to light 20. The $\frac{1}{3}$-$\frac{2}{3}$ vcc deadband of IC1 reset also aids in preventing false alarms due to ambient light.

It can be seen that a major advantage of the present invention is the fact that the transmitter unit 11 is easily installed and removed from one automobile A1 to another. This can reduce the cost of providing automobile protection by simply placing a transmitter unit 11 in any vehicle that is going to be driven by an operator to a location where protection is desired. Typically, the range of protection is up to 500 yards for an AM radio and 1,000 yards for an FM radio either of which should be ample for most circumstances.

The present invention utilizes two channels which will be adequate for most purposes. It is understood, however, that many different channels could be used by way of employing a circuit IC2 for each set of two channels and providing outputs in parallel to Q2 as is done through diodes D3 and D4.

Finally, LDR1 and auxiliary sensor 14 are selectable via switch S1. It is to be understood that both sensors could be used simultaneously by a suitable switch replacement and indeed, any number of sensors can be used if so desired.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A security system for indicating access to a protected area comprising a transmitter means providing a radio frequency signal, power supply means for supplying electric power to said transmitter means, receiver means adapted to continuously receive said radio frequency signal as an input signal and to provide a receiver output signal in response to said received input signal, indicating means operatively coupled to said receiver means and responsive to a disabling condition of an insufficient said input signal to provide said receiver output signal, said radio frequency signal having a first and second frequency component, said receiver output signal in response to said first frequency component and a second receiver output signal in response to said second frequency component, said indicating means adapted to be responsive to said first and second receiver output signals for providing an indicator output signal in the absence of one of said first and second receiver output signals.

2. In the system as defined in claim 1 wherein said transmitter means further includes sensor means responsive to access to the protected area and providing an output signal indicating access to the protected area.

3. In the system as defined in claim 1 wherein said indicating means includes alarm means for providing an alarm signal in the absence of either said first or second receiver output signal.

4. In the system as in claim 1 wherein said transmitter means is located within the protected area.

5. In the system as in claim 2 wherein said sensor means is located within the protected area.

6. In the system as in claim 2 further including transmitter control means responsive to said output signal of said sensor for producing a disabling condition for said transmitter means in response to access to the protected area.

7. In the system as defined in claim 6 wherein said transmitter control means includes switch means for selectively energizing or de-energizing said transmitter means, said switch means responsive to said sensor means for de-energizing said transmitter means when access to the protected area has occurred.

8. In the system as defined in claim 7 wherein said sensor is a photocell for providing an output signal indicating that access to the protected area has occurred.

9. In the system as defined in claim 2 wherein said sensor means is a photocell responsive to light associated with access to the protected area.

10. In the system as in claim 9 wherein said photocell and said transmitter means are located within the protected area.

11. In the system as in claim 2 further including alarm means responsive to said output signal from said sensor means for providing an alarm signal in response to access to the protected area.

12. In the system as in claim 11 further including circuit connection means for selectively connecting or disconnecting said power supply means to said transmitter means.

13. In the system as in claim 12 wherein said transmitter means further includes time-delay circuit means for preventing operation of said alarm means for a predetermined time period after electric power is supplied to said transmitter means from said power supply means by said connection circuit means.

14. In the system as in claim 11 wherein said protected area is a vehicle having doors and including an interior light responsive to opening of any door such that an interior light is illuminated when any door is open, said sensor means including a light-sensitive photocell responsive to an interior light of a vehicle and providing a photocell output signal to said alarm means when an interior light of a vehicle is illuminated, said alarm means providing an alarm signal when any door is opened.

15. In the system as defined in claim 2 further including alarm means responsive to said output signal from said sensor means for providing an alarm signal upon access to the protected area.

16. In the system as defined in claim 15 wherein said alarm means includes time-delay circuit means for preventing the activation of said alarm means for a predetermined time period for allowing a person to exit the protected area within said time period without producing said alarm signal.

17. A method of detecting access to a vehicle that utilizes a radio frequency transmitter in the vehicle and operated by a sensor responsive to access to the vehicle, the transmitter providing a radio signal having a first and second frequency component, further including a remote radio signal receiver adapted to receive the transmitted signal and providing a first output signal in response to reception of the first frequency component and a second output signal in response to reception of the second frequency component, alarm circuitry responsive to the absence of one of the first and second output signals from the receiver comprising the steps of:
A. continuously transmitting the two frequency-component radio signal by the transmitter;
B. continuously monitoring by the receiver of the transmitted signal; and
C. activating the alarm circuitry in the absence of one of the first and second frequency signals.

18. In the method of claim 17 wherein step B further includes the step of:
D. deactivating the transmitter by the sensor when access to the vehicle has occurred.

* * * * *